J. TCHERNIAC & U. GÜNZBURG.
Apparatus for Making Sulphocyanides.
No. 222,100.  Patented Nov. 25, 1879.
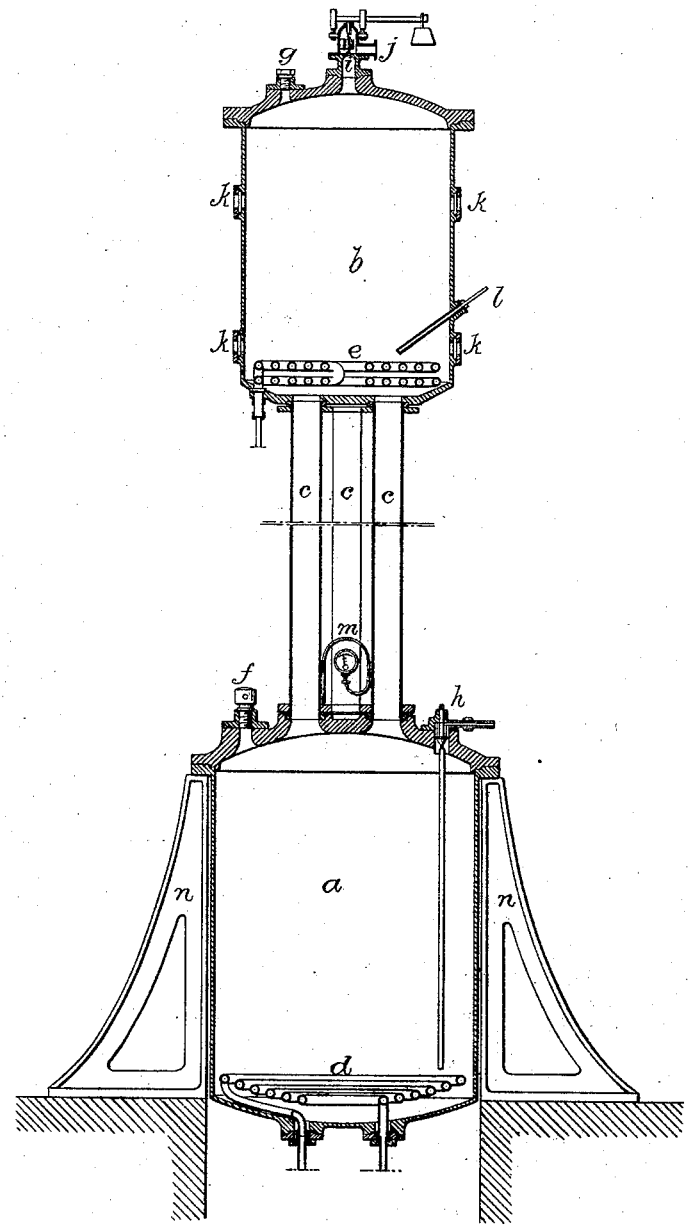

UNITED STATES PATENT OFFICE.

JOSEPH TCHERNIAC AND URY GÜNZBURG, OF PARIS, FRANCE.

IMPROVEMENT IN APPARATUS FOR MAKING SULPHOCYANIDES.

Specification forming part of Letters Patent No. 222,100, dated November 25, 1879; application filed September 25, 1879.

*To all whom it may concern:*

Be it known that we, JOSEPH TCHERNIAC and URY GÜNZBURG, of Paris, France, have invented certain Improvements in Apparatus for the Manufacture of Sulphocyanides, of which the following is a specification.

Our invention relates to certain improvements in the construction of apparatus for the production of sulphocyanide of ammonia, the method of operation being the same as that described in an application for a patent filed by us on the same date as this.

This method of producing sulphocyanides and ferrocyanides may be briefly described as follows: Sulphuret of carbon is caused to react, in a heated receiver, on an ammoniacal solution, thereby forming sulphocyanide of ammonium, which can then be treated with lime to convert it into sulphocyanide of lime, and the ammonia recovered. The sulphocyanide of lime serves as a medium for the production of any other sulphocyanides. To convert any sulphocyanide into a ferrocyanide we heat to a red heat a mixture, in definite proportions, of the sulphocyanide, lime, carbon, and iron. It is then treated with water, and the ferrocyanide crystallized.

The present invention does not, however, relate to the process which forms the subject of a separate application for Letters Patent filed September 25, 1879, but to the apparatus intended more particularly for the production of sulphocyanide of ammonia; and the object of our invention is to construct an apparatus in which the sulphuret of carbon may be caused to thoroughly react on an ammoniacal solution, and thus readily and economically form sulphocyanide of ammonia. This object we attain by combining two heating-vessels with vertical communicating tubes and steam-coils, as more fully described hereinafter, reference being had to the accompanying drawing, the figure in which represents a vertical section of the apparatus.

The apparatus is composed of a cylindrical vessel, $a$, enameled on the inside, and supported on brackets $n$. This vessel is in communication, through a number of vertical tubes, $c\ c$, with another vessel, $b$, also enameled on the inside. The vessel $a$ is furnished at its lower end with a coil of pipe, $d$, through which steam circulates to heat the vessel, and in the lower part of the vessel $b$ is a coil, $e$, for the circulation of cold water.

The lower vessel, $a$, is provided with a pressure-gage, $m$, a supply-opening, $f$, closed by a screw-plug, and an emptying-cock, $h$, with a vertical pipe, which extends nearly to the bottom of the vessel $a$.

The upper vessel, $b$, is provided with a filling-opening, $g$, closed by a plug, look-holes $k\ k$, and a thermometer, $l$.

The gases, set free when the apparatus is in operation, escape through a tube, $i$, in the upper part of the vessel $b$, provided with a safety-valve, $j$, which can be regulated at pleasure, so that the sulphuret of carbon and ammonia can be combined at any desired pressure.

Through the opening $g$ the apparatus is filled up to the point $l$ in the vessel $b$ with chemically-proportionate quantities of sulphuret of carbon and ammonia at any suitable degree of concentration. The plug being put in place, steam is then caused to circulate through the coil $d$ and cold water through the coil $e$. Owing thus to the difference in the temperatures of the two vessels a continuous conversion of the contents into vapors is produced in the upper vessel, where they are condensed, and the condensed liquid continually flows back again, while the gases pass off through the tube $i$.

When the reaction is complete the liquid is drawn off through the tube $h$.

We claim as our invention—

In an apparatus for the production of sulphocyanides, the combination of the lower and upper vessels, $a$ and $b$, with communicating pipes $c\ c$, steam-piping $d$ in the lower vessel, and cold-water piping in the upper vessel, substantially as set forth.

In testimony whereof we have signed our names to this specification in the presence of two subscribing witnesses.

JOSEPH TCHERNIAC.
URY GÜNZBURG.

Witnesses:
JOSEPH DELAZY,
ROBT. M. HOOPER.